United States Patent [19]
Bing

[11] 3,917,392
[45] Nov. 4, 1975

[54] UNIQUE PRISMATIC ELEMENT AND PROJECTION SYSTEM
[75] Inventor: Herbert A. Bing, Wayland, Mass.
[73] Assignee: Polaroid Corporation, Cambridge, Mass.
[22] Filed: Feb. 25, 1971
[21] Appl. No.: 118,963

Related U.S. Application Data
[63] Continuation of Ser. No. 767,609, Oct. 15, 1968, abandoned.

[52] U.S. Cl. ............................... 353/81; 352/78 R
[51] Int. Cl.² ........................................ G03B 21/28
[58] Field of Search ............ 353/81; 352/31, 32, 72, 352/78, 104; 350/286

[56] References Cited
UNITED STATES PATENTS
| | | | |
|---|---|---|---|
| 1,668,015 | 5/1928 | Harris | 350/55 |
| 2,378,416 | 6/1945 | Like | 352/32 |
| 3,305,296 | 2/1967 | Nicosia | 352/78 R |
| 3,547,529 | 12/1970 | Anthes | 352/72 |

FOREIGN PATENTS OR APPLICATIONS
176,289  8/1951  Austria

Primary Examiner—Harry N. Haroian
Attorney, Agent, or Firm—David L. Thorton; Robert L. Berger

[57] ABSTRACT

An optical system employing a novel element occupying a minimum of space and substantially extending the geometrical distance between the source of a converging beam of light and its focal point. In a preferred embodiment the novel element is prismatic in nature, has a low power factor and includes a light receiving concave transparent face, a flat reflective surface for redirecting the beam of light as it passes through the element and a convex transparent face through which the beam of light leaves the element, each of which transparent face is radially symmetric.

10 Claims, 7 Drawing Figures

UNIQUE PRISMATIC ELEMENT AND PROJECTION SYSTEM

This is a continuation of application Ser. No. 767,609 filed Oct. 15, 1968, now abandoned.

BACKGROUND OF THE INVENTION

1. Field of Invention

This invention relates to the field of optics and, more particularly, to improved techniques for extending the geometrical distance between the source of a converging beam of light and its focal point.

2. Description of Prior Art

In recent years advances of tremendous significance have been made in the photographic arts. Many of these developments have greatly simplified and expedited the task of the amateur photographer. The impact on the public of the one-step photographic process employing diffusion transfer techniques is a matter of record and generally well known. As a result of this work, the field of still photography is no longer hampered by extensive periods of delay previously associated with waiting for the exposed film to be developed by a distant laboratory. Even the amateur photographer can now see the fruits of his efforts in a matter of seconds.

Important improvements have also been made in the field of motion picture photography. For instance, camera motion picture film cassettes are now commercially available which are adapted to be quickly mounted as a unit into a camera for exposure purposes. After exposure, the cassette can be readily removed from the camera and mailed to a processing laboratory. Special motion picture projector systems and compatible film cassettes are available which facilitate quick and easy projection of the exposed and developed film strip. Unfortunately these systems in combination still do not resolve the time delay problem associated with the motion picture film processing procedure itself.

Most recently, certain developments have been made which virtually eliminate the traditional time delay associated with the processing of motion picture film. These developments have provided systems which permit the photographer to view the results of his work immediately after the exposure process has been completed. Most advantageously they provide a film handling cassette from which the film need never be removed during exposure, developing, projection and editing procedures. Such systems are described in U.S. Pat. Nos. 3,584,944, issued June 15, 1971 in the name of Gerald H. Cook; 3,597,062, issued Aug. 3, 1971 in the name of Rogers B. Downey; 3,615,127, issued Oct. 26, 1971 in the name of Edwin H. Land and 3,584,942, issued June 15, 1971 in the name of Rogers B. Downey, all of which are assigned to the assignee of the present invention.

One can readily appreciate that in any of those situations where film is packaged in a compact multipurpose cassette, space and geometric limitations become critical considerations. These problems are compounded in the case of cassettes employed in a projector where provision must be made for bringing the projector's illumination system into operative relationship with the film strip contained in the cassette. In those cassette-projection systems presently being marketed, the illumination system of the projector includes a mirror which is positioned in a recess of the cassette behind a section of film contained therein and, consequently, a critical limitation is placed on either the nature of the light source or its spacing from the film, or both. The problem is even more complex in cases where a single cassette is employed in both the camera and projector, and worse still where such a cassette is intended to be utilized in heretofore designed cameras already on the market and currently enjoying extensive use.

This invention in its preferred embodiment overcomes the limitations of the prior art in this respect by providing unique means for permitting an effective illumination system to be employed with compact motion picture film cassettes in a minimum of space.

It is therefore a primary object of this invention to provide a film projection illumination system in which the light source can be spaced a greater distance from the film than heretofore possible.

A further object of this invention is to provide a unique optical element for use with a converging beam of light which increases the distance between the light source and the focal point of the converging beam.

Another object of this invention is to provide a uniquely configured prismatic element which may be employed with a converging beam of light to increase the distance between the light source and the focal point of the converging beam.

An additional object of this invention is to provide a uniquely configured prismatic element having a low power factor which can be employed with a converging beam of light to increase the distance between the light source and the focal point of the converging beam.

Still another object of this invention is to provide a reflective element which can be conveniently employed within the limiting dimensions of a motion picture film cassette in operative relationship with the illumination system of a projector.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

SUMMARY OF THE INVENTION

A preferred embodiment of this invention briefly comprises a compact motion picture film cassette in which motion picture film is retained on reel means for selective reversible transport across a film gate. The cassette is adapted to be mounted in a projector for projection purposes and may also be adapted for mounting in a camera for exposure purposes. It includes a recess provided behind the film disposed across the film gate and in which a reflective prismatic element is mounted. When positioned in the projector, the reflective prismatic element is in operative relationship with the illumination system of the projector to receive a converging cone of light therefrom through a first transparent face and to redirect the beam of light through a second transparent face and thence, through a frame of the film disposed across the film gate to the projector's lens system.

The first, or light receiving transparent face of the prism, is a radially symmetric concave surface while the transparent face through which the beam of light leaves the prismatic element is a radially symmetric convex surface. These two transparent faces are so configured that the prismatic element has a low power factor, i.e., virtually imparts neither a magnification nor a minimization effect to the light beam as it passes therethrough. This uniquely configured reflective element permits the light source to be positioned a greater geometrical distance from the film and projector lens, without reducing the effective illumination from the light source or materially altering the nature of the filament image within the projector lens, minimizing the cross sectional dimension of the cassette structure.

DESCRIPTION OF THE PREFERRED EMBODIMENT

Figure 1:
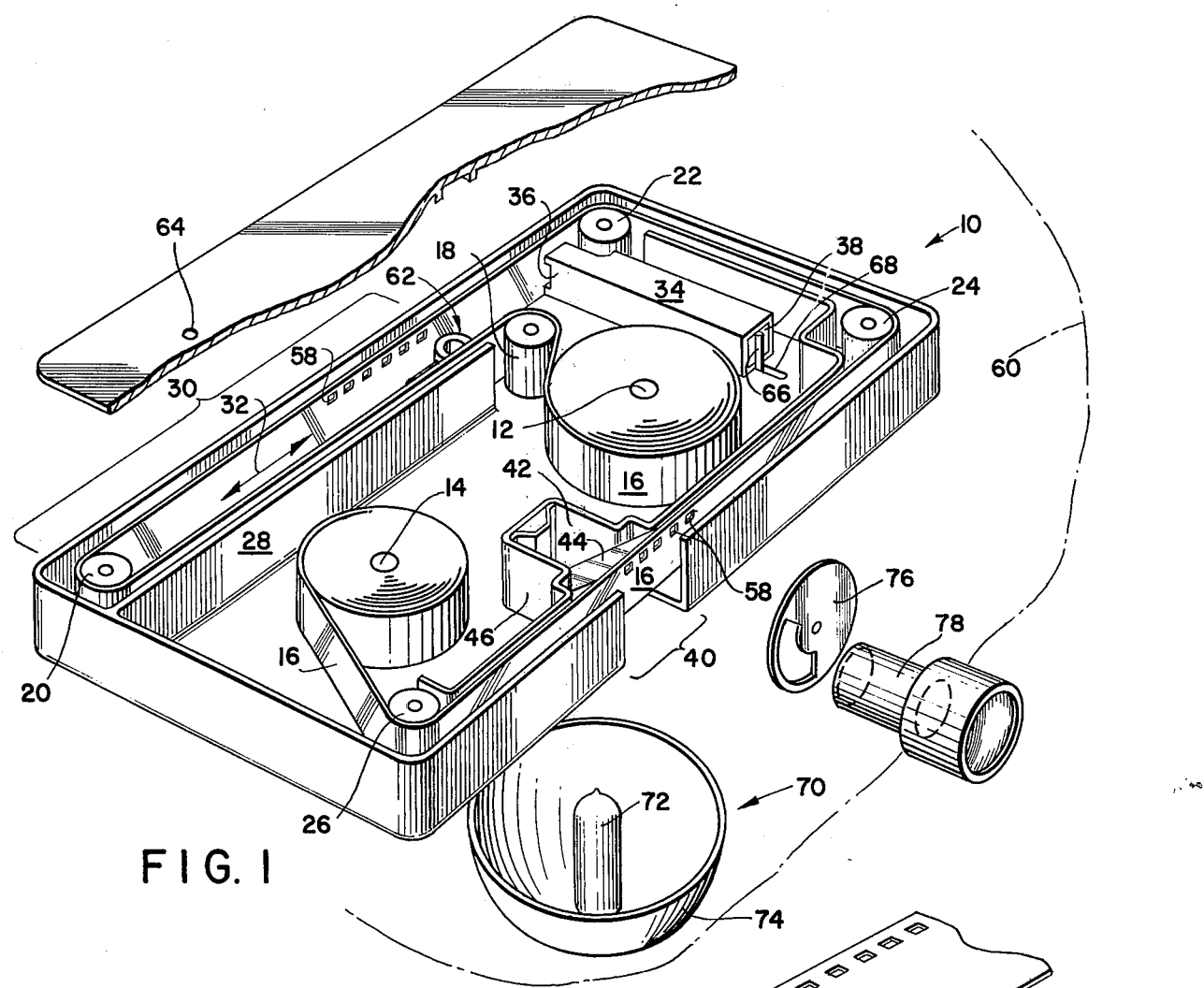
FIG. 1 is a diagrammatic perspective view of a motion picture film system including a compact multipurpose cassette mounted in a projector and embodying features of this invention.

This invention can best be understood by first referring to FIG. 1 of the drawings. The particular cassette 10 shown therein includes a supply reel 12 and a take-up reel 14. Respective ends of a strip of motion picture film 16 are attached to these reels 12, 14. In passing from the supply reel 12 to the take-up reel 14, the strip of film 16 travels consecutively around idlers 18, 20, 22, 24 and 26. A baffle plate 28, in conjunction with a wall section 30 of the cassette 10 defines a drying chamber 32 through which the film is transported as it passes between idlers 18 and 22 and around idler 20. The cassette 10 also includes a container 34 of viscous development composition suitable for developing latent images recorded on the film strip 16 during exposure. One end of this container 34 comprises a doctor blade 36 oriented in operable relationship with the film strip 16 between the drying chamber 32 and the idler 22. Slidably positioned in the other end of the container 34 is a plunger 38 operable in a manner to be hereinafter described to urge the viscous development composition across the doctor blade 36 onto the film strip 16.

The cassette 10 is also provided with a film gate 40 across which the film strip 16 passes in traveling between idlers 24 and 26. Provided behind the film gate 40 and film strip 16 is a recess 42 of the cassette structure 10 in which is permanently mounted by any suitable means a prismatic element 44. A baffle member 46 is disposed behind the film gate 40 and around the built-in prismatic element 44 extending internally of the cassette 10 partially around the idler 26 and around idler 24 towards the idler 22 to prevent light from penetrating the interior of the cassette structure itself.

Figure 2:
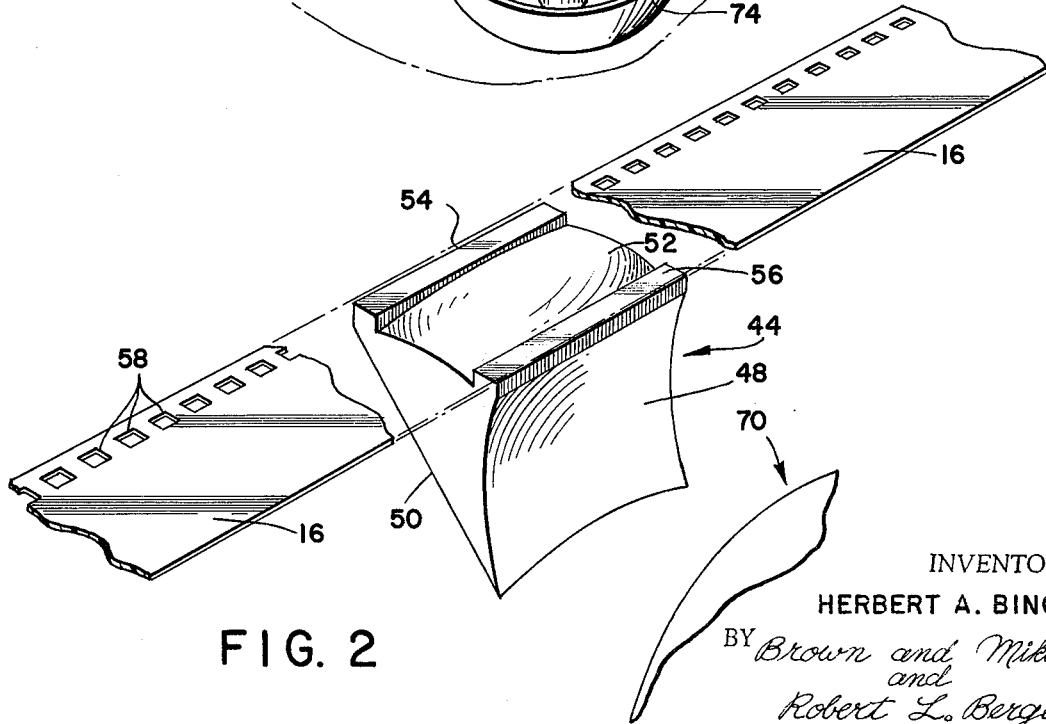
FIG. 2 is a perspective view of a preferred form of prismatic element mounted in the cassette of FIG. 1.

The detailed configuration of the prismatic element 44 is shown in FIG. 2 of the drawings. In its preferred form it includes a light receiving transparent face 48 which comprises a concave surface. A flat reflecting surface 50 is angularly disposed behind the light receiving transparent face 48 and redirects light entering the prismatic element 44 through that transparent face outwardly through a second transparent face 52, which is convex in nature, onto the film strip 16 and thence through the film gate 40. Advantageously, the prismatic element 44 may be provided with parallel bearing surfaces 54 and 56 disposed on opposite sides of the convex transparent face 52 and on which the film strip 16 is then supported as it is transported across the film gate 40. Many suitable materials, such as glass, are available from which the prismatic element 44 may be formed. Additionally, certain clear plastic materials such as that marketed under the name "Lenan" by the General Electric Company of Schenectady, New York, can advantageously be employed since they readily lend themselves to low cost mass production techniques. It is, of course, necessary that the selected material have an index of refraction substantially greater than that of air.

It should be understood that the reflecting surface 50 may be either entirely metalized with a suitable material, such as aluminum or silver, or only partially metalized. In the latter case, this surface 50 would only be metalized on that portion where the angle of incidence of the reflected light rays is less than the critical angle at which they are refracted parallel to that surface. In this manner the total internal reflection characteristic of the uncoated portion of the reflective surface 52 can be utilized to improve the illuminating efficiency of the prismatic element 44.

In order to avoid imparting any distortion to images carried by a beam of light passing through the prismatic element 44, the concave and convex transparent faces 48, 52 are preferably radially symmetric, i.e., either spherical or aspherical in nature. Further, for the same purpose, they are complementary in nature such that the prismatic element 44 has a low power factor, i.e., virtually neither magnifies nor minimizes images carried by a beam of light passing therethrough. These aspects of the prismatic element 44 will be discussed in more detail hereinafter.

Cassette 10 is initially furnished with most of the film strip 16 in its photosensitive state coiled on the supply reel 12. For exposure purposes, the cassette 10 is mounted in an appropriate camera (not shown) with the take-up reel 14 engaging drive means of the camera. In this use the film gate 40 serves as an exposure station through which images are directed by the camera lens through a camera shutter onto the photosensitive film in its passage from the supply reel 12 to the take-up reel 14. During the exposure sequence, the film drying chamber 32 is inoperative or passive and the viscous development composition in the container 34 is not emitted from the doctor blade 36 onto the film strip 16. As the film 16 is drawn onto the take-up reel 16 by power supplied thereto from the camera, it is simultaneously advanced past the film gate 40 in incremental steps by a typical claw mechanism or the like of the camera cooperating with sprocket holes 58 appropriately provided in the film strip. In the embodiment illustrated, the photosensitive surface of the film strip 16 faces inwardly such that exposure of the emulsion is effected through the transparent film base.

Idler 24, around which the film strip 16 passes on its way to the film gate 40, may, if desired, be mounted on a movable post spring biased towards the corner which it occupies of the cassette 10 and capable of movement resiliently inward away from the corner. Concurrently, idler 26 may be designed in accordance with current practice to provide a snubbing action. This represents one way to minimize strain on the film strip 16 by the intermittent film advancement structure engaging the sprocket holes 58 of the film.

In its first use in the camera, the cassette assembly 10 functions similar to other camera cassettes. After the entire length of film 16 has been exposed to image bearing light, substantially its entire length will then have been coiled onto the take-up reel 14 and unwound from the supply reel 12.

While the film processing may be accomplished with the cassette 10 mounted in the camera, it is preferably accomplished in a special projector 60 diagrammatically illustrated in FIG. 1 of the drawings. When the multi-purpose cassette 10 is mounted in the projector 60, drive means of the projector engage the supply and take-up reels 12, 14 of the cassette such that the film strip 16 can be selectively transported in either direction across the film gate 40. Also, as the cassette 10 is mounted in the projector 60, a baffled orifice 62 provided in the cassette at one end of the drying chamber 32 engages a duct (not shown) of the projector through which warm air from a heater and blower unit (not shown) of the projector is introduced into the drying chamber. A port 64 is provided in the structure of the cassette 10 in the vicinity of the other end of the drying chamber 32 through which air can be exhausted from that chamber. Thus, warm air from the heater and blower unit of the projector may be selectively introduced into the drying chamber 32 through the baffled orifice 62 and exhausted therefrom through the port 64.

A lever arm 66 of the projector 60 is introduced into the interior of the cassette 10 through a slot 68 suitably provided in the cassette housing. This lever arm 66 bears against the plunger 38 and can be selectively operated to drive the plunger interiorly of the container 34 such that the viscous development composition will be emitted across the doctor blade 36 onto the film strip 16.

An illumination system 70 in the projector 60, which may consist of a lamp 72 and a condenser or reflector 74, directs a cone of light onto the light receiving transparent face 48 of the prismatic element 44 positioned in the recess 42 of the cassette 10. The converging beam of light from the illumination system 70 is redirected by the flat reflecting surface 50 of the prismatic element 44 outwardly through the element's second transparent face 52, thence through the film strip 16 disposed across the film gate 40, through a shutter mechanism 76 of the projector and into the projection lens 78 located at its focal point.

As previously indicated, when the cassette 10 is initially mounted in the projector 60, substantially the entire exposed portion of the film strip 16 is coiled on the take-up reel 14. The film is processed during a rapid rewind of the exposed film from the take-up reel 14 to the supply reel 12. Processing is accomplished in part by operation of the lever arm 66 extending from the projector into the cassette 10 against the plunger 38 which causes the viscous development composition in the container 34 to be emitted across the doctor blade 36 onto the exposed film strip 16 as it passes in front of the doctor blade on its way to the supply reel 12. The doctor blade 36 is actually spaced a carefully predetermined distance from the surface of the film strip 16 to express a metered thickness of viscous developer onto the photosensitive surface of the film. For rewinding purposes, it is not necessary for the film strip 16 to be completely dry as long as the surface of the wetted film strip is sufficiently dry to provide a skin or protective layer over the still damp emulsion beneath. To assist in the formation of this initial protective skin, the drying chamber 32 is preferably rendered functional during this stage of operation.

After the film strip 16 has been rewound on the supply reel 12 with the development composition applied thereto, it is ready to be projected. During the initial projection stage, the drying chamber 32 is energized and the driving force on the lever arm 66 disengaged such that no viscous fluid is expressed across the doctor blade 36 onto the film strip 16. Additionally, the projector's illumination system 70 is energized, the take-up reel 14 rotated by the projector's drive means and the shutter mechanism 76 operated in conjunction with conventional claw or other type means (not shown) for engaging the sprocket holes 58 of the film strip 16 and incrementally advancing same across the film gate 40. Typically, the drive means of the projector 60 advance the film strip 16 across the film gate 40 at a much slower rate than it was rewound onto the supply reel 12 during the developer application stage. Consequently, as the film strip makes its double pass through the drying chamber 32 around the idler 20, it is completely dried before reaching the film gate 40. As the film strip progresses across the film gate 40, the converging beam of light from the illumination system 70 enters the prismatic element 44 through its concave transparent face 48 and is redirected by its flat reflecting surface 50 through its convex transparent face 52, thence through the film strip 16 into the projection lens 78. The projection lens 78 facilitates presentation of the developed images on an appropriate screen (not shown) for viewing purposes.

Subsequent viewings of the fully processed film strip can be effected by relative rapid rewinding in the projector of the film strip 16, onto the supply reel 12 and then energizing the projector's illumination system and drive means to transport the film strip at the appropriate projection speed across the film gate 40 from the supply reel 12 onto the take-up reel 14. Obviously during these operations associated with subsequent projections of the fully processed film strip 16, it is not necessary to activate either the drying chamber 32 or the lever arm 66, which otherwise would cause development composition to be expressed onto the film strip as it passes the doctor blade 36.

The inventive concepts hereinvolved reside in the unique prismatic element 44 and its use in connection with converging beams of light. It should therefore be understood that the system described above, i.e., a particular type of multi-purpose compact motion picture film cassette and a unique projection system merely constitutes a typical application in which this invention may advantageously be employed. The type of cassette and projector described is similar to that illustrated in the aforementioned U.S. Pat. No. 3,615,127, issued Oct. 26, 1971 in the name of Edwin H. Land and assigned to the assignee of the present invention. This invention can equally advantageously be employed in connection with the compact cassette film handling systems described in the other aforementioned U.S. Pat. Nos. 3,584,944, issued June 15, 1971; 3,597,062, issued Aug. 3, 1971 and 3,584,942, issued June 15, 1971 and all assigned to the assignee of the present invention.

Figure 3:
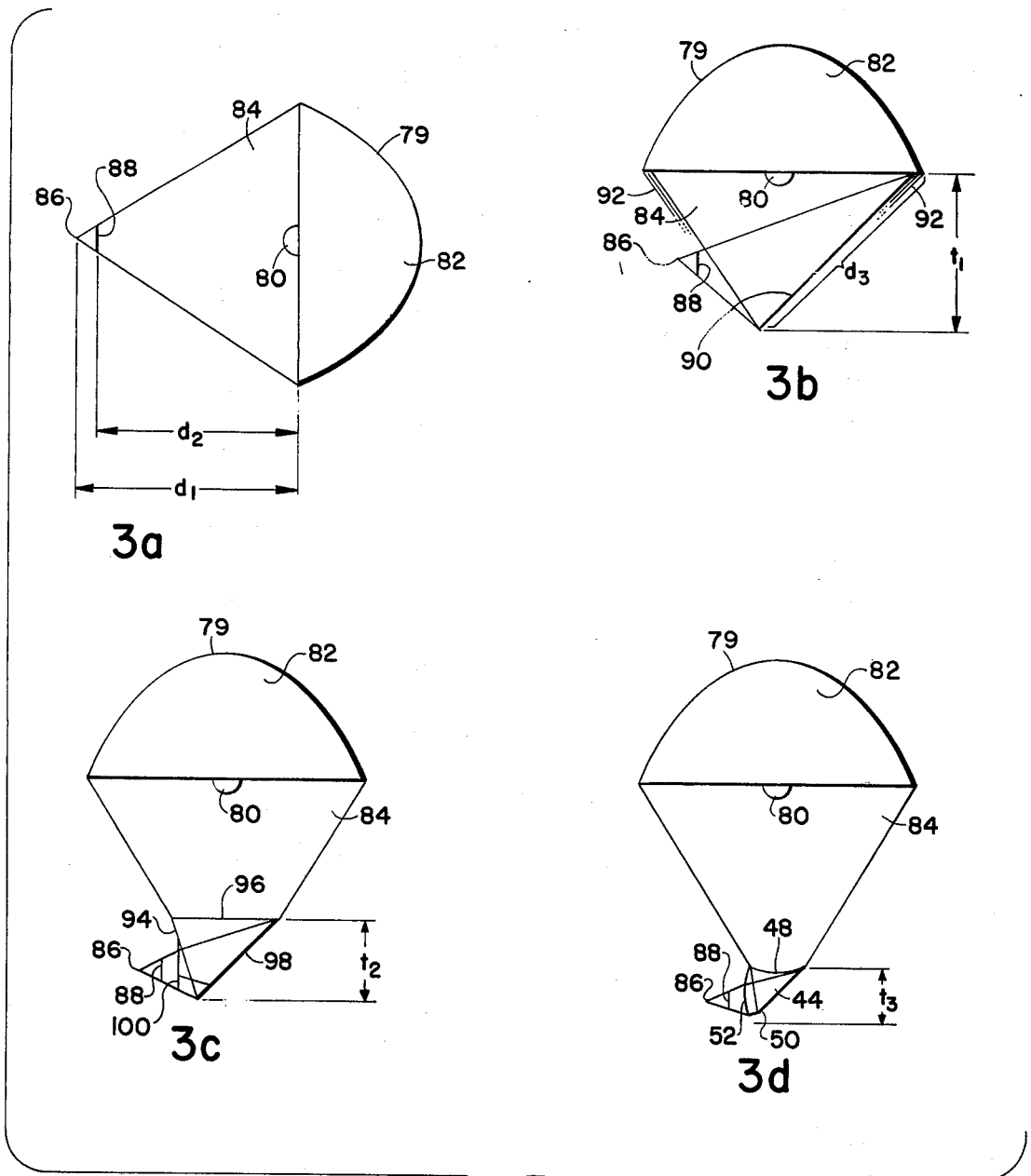
FIG. 3 constitutes a number of diagrammatic illustrations explanatory of the advantages derived from this invention.

The particular highly desirable advantages derived from the present invention can best be appreciated by referring to the various illustrations comprising FIG. 3 of the drawings. In FIG. 3a, a commercially available illumination system 79 is illustrated, consisting of a lamp 80 and a condenser or reflector 82, which directs a converging beam of light 84 to a focal point 86. Typical of such an illumination system is the DNF Halogen lamp 150 QTB/LVD marketed by the Photolamp Products Division, Sylvania Electric Products, Inc. of Salem, Massachusetts. In such a system, the diverging rays of light emitted by the lamp 80 are collected by the reflector 82 and directly focused at the focal point 86. Alternately, the illumination system may take the form of more traditional types such as those wherein the focal point of the reflector is at the lamp itself and a lens positioned in front of the lamp focuses a converging beam of light carrying the filament image at a particular focal point. In any case the nature of the illumination system 79 is determinative of a distance $d_1$ between the lamp 80 and the focal point 86 of the converging beam 84. In projection systems, a frame of fully developed image bearing film strip or a slide of fully developed image bearing film 88 is positioned between the focal point 86 and the lamp 80 to intercept the converging beam of light 84. For effective operation, it is necessary that the frame of film 88 be positioned a fixed distance $d_2$, determined by the size of the frame, from the lamp 80 such that the entire converging beam passes through the frame and completely illuminates the images recorded thereon. The nature of the projection lens located at the focal point 86 is determined by the size of the filament of the lamp 80, i.e., the filament image at the focal point 86 is preferably completely contained within and substantially fills the effective aperture of the lens.

Reiterating, for effective utilization, the nature of the projection lens and the illumination system bear a fixed relationship and the nature of the illumination system determines fixed distances between the lamp and the film and between the lamp and the projection lens. For instance in the case of the aforementioned illumination system marketed by Sylvania Electric Products, Inc. which will be assumed to be utilized in all of the systems illustrated in FIG. 3, and employing an f/1.0 lens having a focal length of 28 mm. and "Super-8" type of film developed by Eastman Kodak Company of Rochester, New York, the distance $d_1$ is fixed at 38 mm. and the distance $d_2$ is fixed at 34 mm.

In many applications of this type, no dimensional or space problems are encountered. However, in other applications such as that illustrated in FIG. 1 wherein use is made of a compact multi-purpose cassette and/or wherein the converging beam of light must be redirected between the illumination system and the projection lens, spacing can and in fact quite often does become a major or critical consideration.

This fact is illustrated in FIG. 3b which depicts the prior art practice of utilizing a mirror 90 to redirect a converging beam of light 84 emitted from an illumination system 79, in this instance consisting of the lamp 80 and reflector 82. Since the geometrical distances $d_1$ and $d_2$, between the lamp 80 and the focal point 86 and the lamp and the frame 88, respectively, are fixed, the lamp must be positioned relatively close to the mirror 90 in order for the frame to be positioned so as not to intercept the converging beam of light 84 as it travels between the illumination system 79 and the mirror. Since the lamp 80 must be placed in close proximity to the mirror 90, it is necessary that the mirror be of a substantial length $d_3$ to receive at least a major portion of the converging beam of light 84. This means that if the mirror is positioned within the recess 42 of the cassette 10 illustrated in FIG. 1, the cassette must have a substantial minimum thickness $t_1$ (See FIG. 3b). Additionally in this instance, it is impossible for all of the rays of light emitting from the reflector 82 to be intercepted by the mirror 90. This situation is illustrated in FIG. 3b in which the lost rays of light are indicated by the numeral 92. In the case selected above, wherein the described Sylvania illumination system is used in conjunction with a 28 mm. f/1.0 lens and "Super-8" film and a mirror 90 utilized to effect a 90° reorientation of the converging beam of light 84, the system's effective illumination is reduced to approximately an equivalent f/1.2 system and the minimum height of the mirror or minimum thickness of the cassette $t_1$ is established at 1.2 inches.

In FIG. 3c, the mirror 90 of the system illustrated in FIG. 3b has been replaced with a prismatic element 94 formed of a glass having an index of refraction of 1.58 and comprising a flat light receiving transparent face 96, a flat reflective surface 98 and a second flat transparent face 100 through which redirected light rays from the reflective surface 98 leave the prismatic element. The prismatic element's first transparent face 96 is disposed to receive the entire cone of light from the illumination system 79. As the beam of light 84 leaves the prismatic element 94 through its second transparent face 100, it passes through the image bearing frame 88 in arriving at its focal point 86 where the projection lens is positioned. The refracting effect of the prismatic element on the cone of light 84 extends the geometrical distance between the lamp 80 and the focal point 86 and permits the lamp and reflector 82 to be positioned a greater distance from the prismatic element than the illumination system could be positioned above the mirror 90 in the system illustrated in FIG. 3b. Thus, the prismatic element 94 can intercept the entire cone of light emitted from the illumination system 79 to maintain the system's effective illumination at f/1.0. Utilizing the same lamp, film and lens combination as considered in the cases of the systems illustrated in FIG. 3a and FIG. 3b, the prismatic element 94 may have a light receiving face 96 of 0.8 inch in length and permits a cassette 10 as illustrated in FIG. 1 to be designed with a minimal thickness $t_2$ equal to 0.6 inch.

As previously indicated the thickness of compact cassettes, such as those of the hereinbefore referenced copending applications, is critical. The restrictions placed on the minimal thickness of such cassettes by the use of a reflecting mirror 90 as employed in the system illustrated in FIG. 3b or the prismatic element 94 as employed in the system illustrated in FIG. 3c can be further alleviated by utilizing the specially configured unique prismatic element 44 of this invention. The use of such a prismatic element 44 is illustrated in FIG. 3d. As previously indicated in connection with the description of FIG. 2, the prismatic element 44 includes radially symmetric concave and convex transparent faces 48 and 52 and a flat reflecting surface 50. The converging beam of light 84 from the illumination system 79 is received into the prismatic element 44 through its concave transparent face 48, is reflected at a 90° angle by the reflecting surface 50 and leaves the prismatic element through its convex transparent face 52. After leaving the prismatic element 44, the converging beam of light 84 passes through the image frame 88 and is focused in the projection lens at its focal point 86.

The curved nature of the prismatic element's transparent faces 48 and 52 further increases the geometric distances between the lamp 80 and the image frame 88 ($d_2$) and between the lamp 80 and its focal point 86 ($d_1$). Ideally this prismatic element 44 is designed to have substantially no power factor, i.e., virtually neither a magnification nor a minimization effect on images carried by the converging beam of light 84. It is desirable that the prismatic element 44 have a low power factor so that the filament image at the focal point 86 will remain completely compatible with the projection lens. This condition is approached from the thick lens relationship $$\text{focal length} = \frac{-R_1 R_2}{(n-1)(R_1 - R_2 - \frac{n-1}{n} l)}$$

wherein $R_1$ and $R_2$ are Surface Radii
$n$ is Index of Refraction
$l$ is Length of Light Travel Path Through Lens It will thus be seen that the prismatic element 44 will have an infinite focal length in accordance with the above equation when $$R_1 = R_2 + \frac{n-1}{n} l$$

While this relationship can be satisfied by properly selecting the values of $R_1$, $R_2$, n or l, it is most easily accomplished by selecting proper values for $R_1$ and $R_2$. However, since the prismatic element 44 is intended to operate with converging rays of light, designing the prism in accordance with the above equations will actually produce an element having a satisfactory low power factor but not of one. For instance, in a typical case employing the same illumination system, lens and image frame as considered in connection with the discussion of FIGS. 3a, 3b and 3c, a prismatic element 44 formed of the same glass employed in the prismatic element 94 of FIG. 3c will have a focal length of virtually infinity and a very low power factor of about 1.3 when $R_1 = 0.500$ inches and $R_2 = 0.669$ inches. In such case, a prismatic element having a concave face 48 intercepting the beam 84 at a point where its diameter is 0.4 inch can be employed, establishing the minimal thickness of the cassette $t_3$ at 0.42 inch.

These conditions have proved to result in a very satisfactory projection system. However, if desirable, further adjustments can be made in the system to obtain even further improved results. For instance, the 28 mm. f/1.0 lens can be positioned a slightly greater distance from the prismatic element or the position of the aperture within the lens changed to obtain optimum compatibility between the lens and the filament image. Alternately, the reflector can be slightly altered to produce a converging beam angle such as to further approach a power factor of one through the prismatic element. Still further, the above stated values of $R_1$ and/or $R_2$ can be adjusted to some small degree to achieve a still lower power factor. When applicable, the final adjustment of these various factors would be made on an individual case basis.

It will thus be appreciated that the use of the unique prismatic element 44 effectively folds the converging beam of light 84 without losing any of its rays, does not result in any material mismatch between the size of the filament image and the projection lens and provides a reflective optical element of minimum thickness.

This invention may be practiced or embodied in other ways without departing from the spirit or essential character thereof. For instance, while a preferred embodiment of the invention as illustrated in FIGS. 1 and 2 of the drawings shows its use in connection with motion picture film, it obviously can be equally advantageously employed in connection with the projection of image bearing slides. It also lends itself to advantageous use with other applications involving converging beams of light. The preferred embodiment of this invention described herein is therefore illustrative and not restrictive, the scope of the invention being indicated by the appended claims and all variations which come within the meaning of the claims are intended to be embraced therein.

What is claimed is:

1. A compact motion picture film handling cassette configured to be mounted in a projector to facilitate film projection operations, such projector having means for forming a beam of light tending to converge at a point a given distance therefrom, comprising:

a housing having a pair of spaced apart substantially parallel external wall members connected together by a transverse external wall member adjacent juxtaposed edges thereof, one of said substantially parallel external wall members having an opening provided therethrough adjacent said transverse wall member, said transverse wall member being relatively short to provide a generally thin configuration to said housing and said housing defining a space in which a coiled strip of motion picture film may be initially positioned;

a film gate provided in said transverse wall member adjacent said opening;

means responsive to drive means of such projector for facilitating the advancement of such strip of film within said housing from said space across said film gate; and light reflecting means, mounted within said housing to be located behind the section of such strip of film disposed across said film gate during advancement of such strip of film within said housing and in operative relationship to said opening to receive substantially the entire converging beam of light from such light beam forming means through said opening when said cassette is mounted in such projector, for redirecting such beam of light through such section of such strip of film and said film gate and for increasing the geometrical distance between such light beam forming means and the point at which such beam of light converges, said light reflecting means including a prism formed of a material having an index of refraction greater than air and having a first transparent face disposed to receive such beam of light and a second convex transparent face disposed adjacent such section of such strip of film to minimize the dimensions of said prism in the plane normal to said external wall members and thus permit the thickness of said housing to be minimized.

2. The cassette of claim 1 wherein said first transparent face of said prism is concave in configuration.

3. The cassette of claim 2 wherein said prism has a low power factor.

4. The cassette of claim 1 wherein said prism folds said beam of light 90°.

5. The cassette of claim 1 wherein said convex transparent face of said prism is radially symmetric.

6. The cassette of claim 2 wherein said convex and concave transparent faces of said prism are radially symmetric.

7. A photographic system comprising:
 a cassette including:
  a housing having a pair of spaced apart substantially parallel external wall members connected together by a transverse external wall member adjacent juxtaposed edges thereof, one of said substantially parallel external wall members having an opening provided therethrough adjacent said transverse wall member, said transverse wall member being relatively short to provide a generally thin configuration to said housing and said housing defining a space in which a coiled strip of motion picture film may be initially positioned;
  a film gate provided in said transverse wall member adjacent said opening;
  first means responsive to drive means of a projector for facilitating the advancement of such strip of film within said housing across said film gate;
 a projector comprising:
  a projection lens;
  means for mounting means for forming a beam of light tending to converge at a point a given distance therefrom;
  means for mounting said cassette with its said opening in operative relationship with such light beam forming means and its said film gate in operative relationship with said projection lens;
  means for driving said first means of said cassette when said cassette is mounted in said projector; and
 light reflecting means positioned within said cassette at least when said cassette is mounted in said projector to be located behind the section of such strip of film disposed across said film gate during advancement of such strip of film within said housing and in operative relationship to said opening to receive substantially the entire converging beam of light from such light beam forming means through said opening when said cassette is mounted in said projector, for redirecting such beam of light through such section of such strip of film and said film gate and for increasing the geometrical distance between such light beam forming means and the point at which such beam of light converges, said light reflecting means including a prism formed of a material having an index of refraction greater than air and having a first transparent face disposed to receive such beam of light and a second convex transparent face disposed adjacent such section of such strip of film to minimize the dimensions of said prism in the plane normal to said external wall members and thus permit the thickness of said housing to be minimized.

8. The system of claim 7 wherein said first transparent face of said prism is concave in configuration.

9. The system of claim 7 wherein said convex transparent face of said prism is radially symmetric.

10. The system of claim 8 wherein said convex and concave transparent faces of said prism are radially symmetric.

* * * * *